United States Patent Office 2,950,804
Patented Aug. 30, 1960

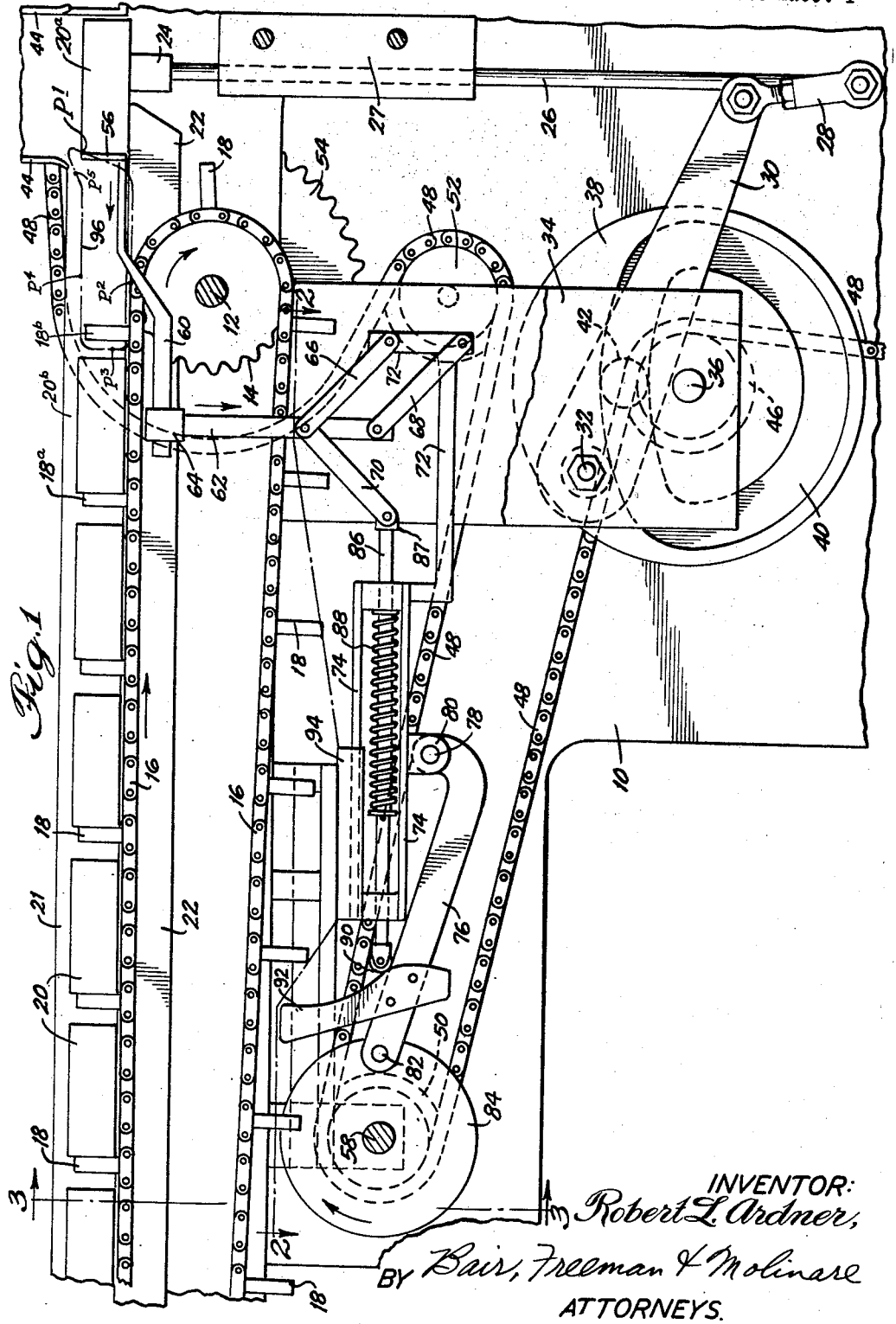

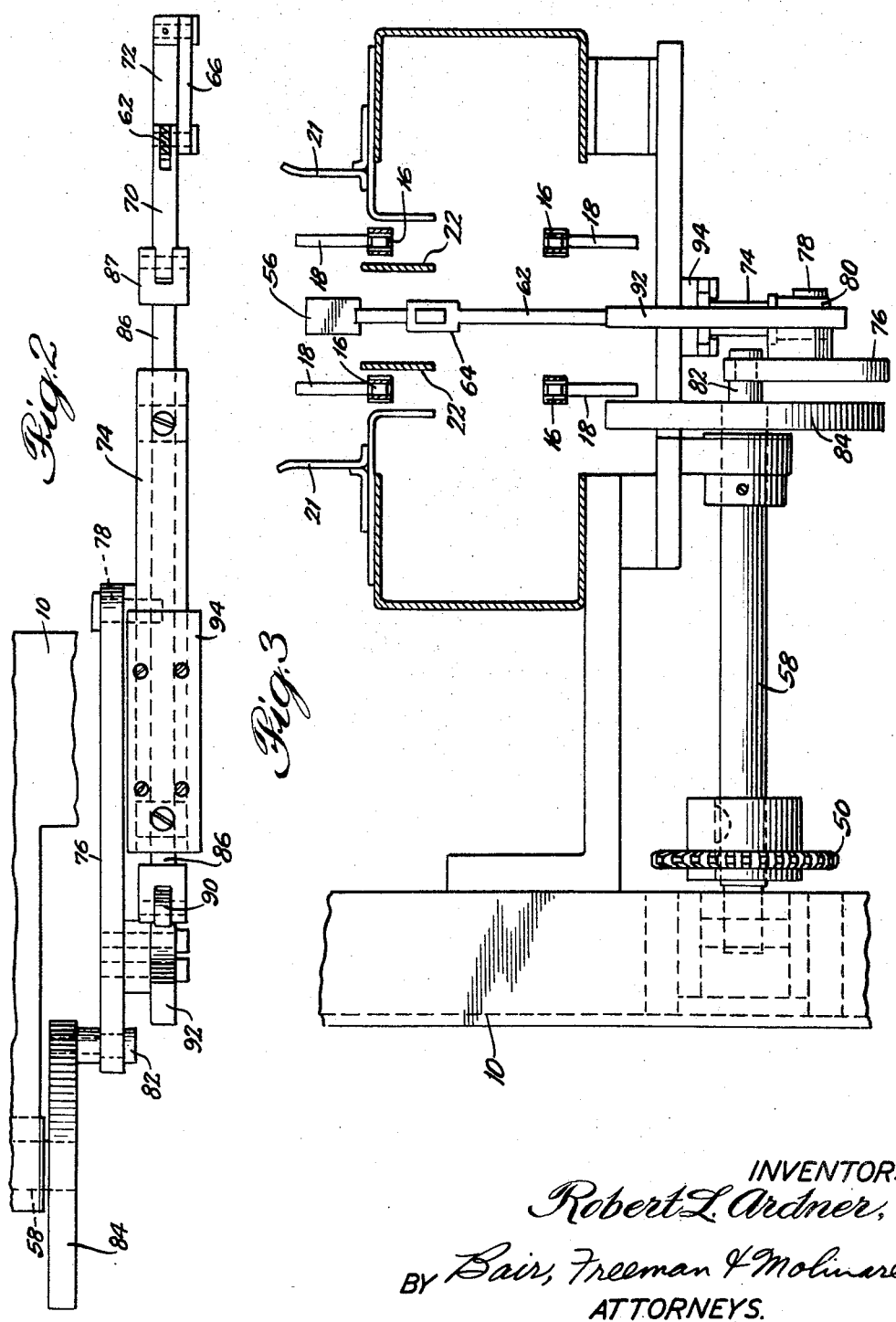

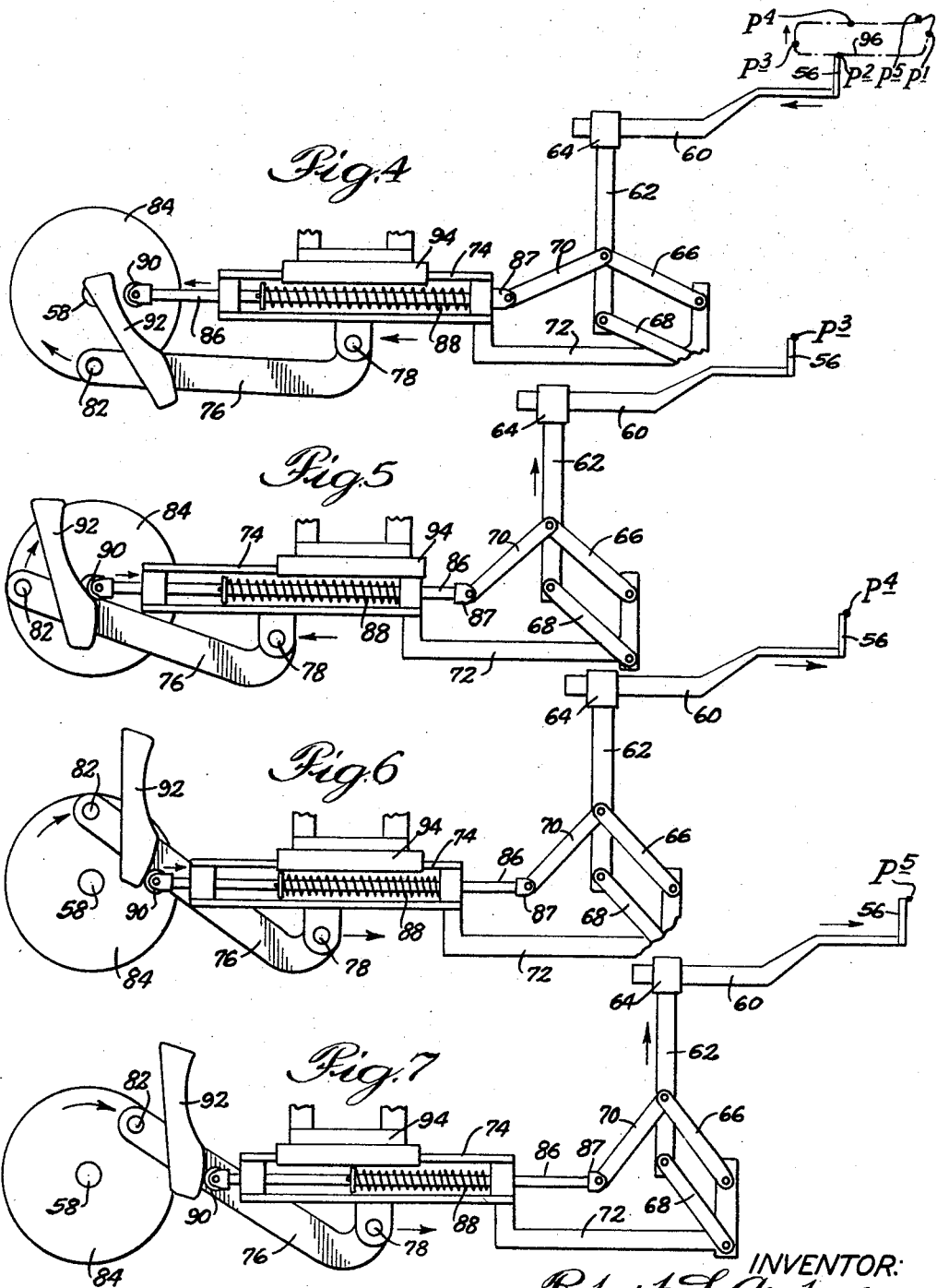

2,950,804
TRANSFER MECHANISM

Robert Leigh Ardner, Anderson, Ind., assignor to Lynch Corporation, Anderson, Ind., a corporation of Indiana Filed Jan. 12, 1959, Ser. No. 786,177

3 Claims. (Cl. 198—24)

This invention relates to a transfer mechanism for transferring articles from a carrier for the articles, such as a conveyor to some instrumentality of a wrapping machine such as an elevator for elevating the articles through a folding way, and contemplates the transfer of an article from the conveyor across a platform or the like to a position on the elevator, the transfer being effected by a pusher that pushes the article along the platform, and then moves downwardly to clear the next article coming from the conveyor onto the platform, whereupon the pusher travels along beneath the second article and is then elevated behind it before pushing it along the platform and to a position over the elevator.

One object of the invention is to provide a simplified mechanism operated from a single machine element such as a crank disc or the like, yet which has a number of coacting parts which produce the above described motion for the pusher without having to provide additional cranks, cams or the like to accomplish the desired vertical motion as well as the horizontal return and pusher operations.

More particularly it is my object to provide a pusher that is carried by a slide and is also movable at substantially right angles relative to the direction of movement of the slide, a toggle link, roller and cam mechanism being provided to accomplish the desired movement relative to the slide with but a single crank pin connection to a crank disc.

Still more particularly it is my object to provide the pusher mounted on a toggle mechanism that is actuated in relation to the slide which carries the toggle mechanism and the pusher by a roller that travels a cam on the connecting rod between the crank pin of the crank disc and the slide.

With these and other objects in view, my invention consists in the construction, arrangement and combination of the various parts of my transfer mechanism, whereby the objects above contemplated are attained, as hereinafter more fully set forth, pointed out in my claims and illustrated in detail on the accompanying drawing, wherein:

Fig. 1 is a vertical sectional view through a wrapping machine and showing my transfer mechanism in its relation thereto, the parts being in one position;

Fig. 2 is a plan view of my transfer mechanism and associated parts of the wrapping machine as taken on the line 2—2 of Fig. 1;

Fig. 3 is a vertical sectional view on the line 3—3 of Fig. 1; and

Figs. 4, 5, 6 and 7 are views similar to a portion of Fig. 1 showing certain parts thereof on a reduced scale and in different positions thereof during one revolution of the crank disc that actuates my transfer mechanism.

On the accompanying drawings I have used the reference numeral 10 to indicate a side frame member of a wrapping machine. A conveyor shaft 12 is journalled in the frame member 10 and a similar one (not shown) on the opposite side of the wrapping machine. Conveyor sprockets 14 are secured thereto around which conveyor chains 16 extend. The chains 16 are provided with spaced lugs 18 for engaging articles 20 such as candy bars or the like to be wrapped. The articles 20 move from left to right in Fig. 1, being slid along a pair of rails 22 between side plates 21.

At the right-hand end of the conveyor 16—18 in Fig. 1 the rails 22 bridge the gap between the conveyor and an elevator head 24 adapted to elevate the articles 20 when thereover through a folding way 44 which folds a wrapper around the candy bar. The head 24 is mounted on a vertically slidable elevator rod 26, a guide 27 being provided therefor. A link 28 is pivoted to the lower end of the elevator rod 26 and to one end of a lever 30 pivoted at 32 to a bracket 34. A cam shaft 36 has thereon a cam 38 provided with a cam groove 40 coacting with a roller 42 on the lever 30 for swinging the lever and thereby reciprocating the rod 26 and the elevator head 24 vertically upon rotation of the shaft 36.

For rotating the shaft 36 a sprocket 46 thereon is driven by a chain 48 from a motor or the like and this chain also drives a sprocket 50 (for actuating my transfer mechanism as will hereinafter appear) and a sprocket 54 on the conveyor shaft 12 after passing around an idler 52.

My transfer mechanism includes a pusher 56 for the article 20 and mechanism interposed between this pusher and a crank shaft 58 driven by the sprocket 50 for actuating the pusher in a desired path of movement relative to the conveyor 16—18, the rails 22 and the elevator head 24 as will hereinafter appear. This mechanism includes a horizontal arm 60 on which the pusher 56 is mounted, a vertical arm 62 connected thereto by means of a connecting bracket 64, three toggle links 66, 68 and 70, a U frame 72, a rectangular frame-like slide 74, and a connecting rod 76 pivoted at 78 to a bracket on the slide 74 and at its other end rotatable on a crank pin 82 of a crank disc 84 on the crank shaft 58. The toggle links 66 and 68 are pivoted in parallelogram manner to the vertical arm 62 and the U frame 72 as illustrated while the toggle link 70 is pivoted to 62 and to a toggle actuating rod 86 slidable in the slide 74 and constrained to the position shown in Fig. 4 with a head 87 on one end thereof against the slide 74 by a spring 88. The other end of the rod 86 is provided with a roller 90 adapted at times to coact with a cam 92 carried by the connecting rod 76 under the bias of the spring 88. The slide 74 is guided in a slide way 94 secured to the frame of the wrapping machine.

*Practical operation*

In the operation of my transfer mechanism, rotation of the crank disc 84 clockwise from the position shown in Fig. 1 one-fourth revolution brings it to the position shown in Fig. 4 and the extreme point of the pusher 56 indicated by the dot P in Figs. 1 and 4 travels the path 96 diagrammed in Fig. 4 from the point P¹ (of Fig. 1) to the point P². Each quarter of a revolution thereafter as shown in Figs. 5 and 6, this point on the pusher describes the path 96, passing through the respective points P³ and P⁴, then P⁵ as in Fig. 7 and finally returning to P¹ position of Fig. 1 to complete the cycle. Consideration of the path 96 makes it evident that the pusher 56 is drawn downwardly as it leaves point P¹ and the far right article 20ª in Fig. 1 so that it does not engage the next article 20ᵇ that would be pushed along the rails 22 by the conveyor lug (specifically 18ª). The pusher 56, after the completion of its stroke, is elevated (point P³, Fig. 5) behind the bar 20ᵇ which at that time is ahead of the lug 18ᵃ at position 18ᵇ in Fig. 1, and the elevation, of course, is accomplished by the action of the toggle linkage by the roller 90 and the cam 92 as shown in Fig. 5. After the pusher is fully elevated, it is then moved forwardly in a straight line passing through the point P⁴ and elevating slightly (point P⁵) at the end of its motion before it moves downwardly again by reverse action of the toggle linkage by relative movement of 86 and 74 while 74 is being reciprocated in the slide way 94.

From the foregoing description it is obvious that I have provided a simplified transfer mechanism for accomplishing a desired path of movement for a pusher or the like with but a single element such as the crank disc 84 rotated in synchronism with the mechanism of the wrapping machine for wrapping the articles 20. By the addition of toggle linkage and the mechanism described to actuate it, the pusher's resultant path of movement is modified instead of being reciprocated only by the crank pin.

Some changes may be made in the construction and arrangement of the parts of my transfer mechanism without departing from the real spirit and purpose of my invention, and it is my intention to cover by my claims any modified forms of structure or use of mechanical equivalents which may reasonably be included within their scope.

I claim as my invention:

1. In a transfer mechanism for wrapping machines and the like, a pusher for articles and means for sequentially imparting to said pusher a pushing movement for one article on a conveyor, depressing and return movements to clear the next article on said conveyor, a substantially vertical elevating movement behind said next article and repetition of the sequence beginning with pushing said next article, said means comprising a slide way, a slide movable therealong, a toggle actuating rod slidable relative to said slide, a toggle link connection between said slide, said article pusher and said toggle actuating rod, a crank and a connecting rod for sliding said slide relative to said slide way, and a cam on said connecting rod coacting with said toggle actuating rod to actuate said toggle link connection while said crank and connecting rod are actuating said slide.

2. In a transfer mechanism for wrapping machines and the like, an article pusher and means for sequentially imparting to said pusher a pushing movement for one article on a conveyor, depressing and return movements to clear the next article on said conveyor, a vertical elevating movement behind said next article and repetition of the sequence beginning with pushing said next article, said means comprising a slide way, a slide movable therealong, a toggle actuating rod slidable relative to said slide, a toggle link connection between said slide and said toggle actuating rod, said pusher being carried by the pivotal connection together of the links of said toggle link connection to impart vertical movement upward of said pusher when the end connections of said toggle link connection are compressed and vertical movement downward when they are extended, means for sliding said slide relative to said slide way, and a cam coacting with said toggle actuating rod to actuate said toggle link connection while said means is actuating said slide.

3. In a transfer mechanism for wrapping machines and the like, an article pusher and means for sequentially imparting to said pusher a pushing movement for one article on a conveyor, depressing and return movements to clear the next article on said conveyor, an elevating movement behind said next article and repetition of the sequence beginning with pushing said next article, said means comprising a slide way, a slide movable horizontally therealong, a toggle actuating rod horizontally slidable relative to said slide, a pair of parallelogram toggle links connecting said article pusher to said slide, a third toggle link connecting said article pusher to said toggle actuating rod, a crank for horizontally actuating said slide, a connecting rod from the crank pin of said crank to said slide and cam means carried by said connecting rod for horizontally sliding said toggle actuating rod relative to said slide to accomplish the depressing and elevating movements of said article pusher in timed relation to the horizontal movement of said slide and thereby said pusher in the horizontal direction.

References Cited in the file of this patent

UNITED STATES PATENTS 1,680,996    Kitchal et al. _____ Aug. 14, 1928